(12) United States Patent
Thomassin et al.

(10) Patent No.: US 10,570,816 B2
(45) Date of Patent: Feb. 25, 2020

(54) ENGINE COUPLING ARRANGEMENT

(71) Applicant: PRATT & WHITNEY CANADA CORP., Longueuil (CA)

(72) Inventors: Jean Thomassin, Sainte-Julie (CA); Bruno Villeneuve, Boucherville (CA); Mike Fontaine, Boucherville (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 68 days.

(21) Appl. No.: 15/708,905

(22) Filed: Sep. 19, 2017

(65) Prior Publication Data
US 2019/0085760 A1    Mar. 21, 2019

(51) Int. Cl.

| | |
|---|---|
| *F02B 53/14* | (2006.01) |
| *F02B 37/00* | (2006.01) |
| *F02B 53/02* | (2006.01) |
| *B64D 27/04* | (2006.01) |
| *F02B 61/06* | (2006.01) |

(Continued)

(52) U.S. Cl.
CPC .............. *F02B 53/14* (2013.01); *B64D 27/04* (2013.01); *F02B 37/005* (2013.01); *F02B 53/02* (2013.01); *F02B 61/06* (2013.01); *B64D 41/00* (2013.01); *F02B 2053/005* (2013.01); *F16D 11/14* (2013.01)

(58) Field of Classification Search
CPC .. Y02T 10/14; Y02T 10/144; F02B 37/00–24; B64D 27/04–08; B64D 33/00; B64D 2033/028; B64D 41/00–007; B64D 2041/002–005
USPC .................................................... 60/716–718
See application file for complete search history.

(56) References Cited

U.S. PATENT DOCUMENTS 1,933,041 A * 10/1933 Bauer .................... F01K 7/025
                                                    60/715
2,585,968 A *  2/1952 Schneider ............ F02B 37/105
                                                    60/608
(Continued)

FOREIGN PATENT DOCUMENTS

DE       3330315 A1 *  3/1985 ............ F02B 37/004
GB        760005 A  * 10/1956 ............ F02B 37/105
(Continued)

OTHER PUBLICATIONS

European Search Report dated Jan. 24, 2019 in counterpart EP application No. EP18194629.4.

*Primary Examiner* — Laert Dounis
(74) *Attorney, Agent, or Firm* — Norton Rose Fulbright Canada LLP

(57) ABSTRACT

An engine assembly includes an intermittent internal combustion engine having an engine shaft, a turbine having a turbine shaft, an output shaft for driving a load, and a gearbox having a first portion and a second portion. The engine shaft is in engagement with an accessory via the first portion. The turbine shaft is in driving engagement with the output shaft via the second portion. The gearbox is configurable between an engaged and a disengaged configurations. In the disengaged configuration, the first and second portions are decoupled, and the engine shaft and the turbine shaft are rotatable independently from each other. In the engaged configuration, the first and second portions are coupled, and the engine shaft and the turbine shaft are drivingly engaged with each other via the coupled first and second portions.

20 Claims, 3 Drawing Sheets

(51) Int. Cl.
*F16D 11/14* (2006.01)
*B64D 41/00* (2006.01)
*F02B 53/00* (2006.01)

(56) References Cited

U.S. PATENT DOCUMENTS

| | | | | |
|---|---|---|---|---|
| 2,622,390 | A * | 12/1952 | Newton | F02B 37/005 244/58 |
| 2,755,618 | A | 7/1956 | Peterson | |
| 2,880,571 | A * | 4/1959 | Glamann | F02B 37/105 60/598 |
| 3,238,713 | A * | 3/1966 | Wallace | F02B 37/105 60/608 |
| 3,503,278 | A * | 3/1970 | Livezey | B60K 5/08 475/23 |
| 3,673,797 | A * | 7/1972 | Wilkinson | F02B 37/105 60/39.17 |
| 4,542,722 | A | 9/1985 | Reynolds | |
| 4,748,812 | A * | 6/1988 | Okada | F02B 37/005 60/614 |
| 5,079,913 | A * | 1/1992 | Kishishita | F02B 37/005 60/597 |
| 5,138,840 | A * | 8/1992 | Oguchi | F01P 5/04 60/597 |
| 5,174,109 | A | 12/1992 | Lampe | |
| 5,329,770 | A | 7/1994 | Ward | |
| 5,729,978 | A * | 3/1998 | Hiereth | F02B 37/105 60/607 |
| 6,615,586 | B1 | 9/2003 | Boric | |
| 6,694,746 | B2 | 2/2004 | Reed et al. | |
| 7,753,036 | B2 | 7/2010 | Lents et al. | |
| 7,775,044 | B2 | 8/2010 | Julien | |
| 7,971,423 | B2 | 7/2011 | Avila et al. | |
| 8,261,550 | B2 * | 9/2012 | Sartre | B60K 6/365 60/607 |
| 8,876,476 | B2 | 11/2014 | Blewett et al. | |
| 9,548,639 | B2 | 1/2017 | Goi et al. | |
| 9,897,010 | B2 | 2/2018 | Libera et al. | |
| 2006/0254565 | A1 * | 11/2006 | Bottcher | F02B 33/36 123/559.1 |
| 2009/0025696 | A1 * | 1/2009 | Lovgren | F02B 37/105 123/559.1 |
| 2011/0100339 | A1 * | 5/2011 | Weyer | F02B 33/34 123/563 |
| 2014/0020381 | A1 * | 1/2014 | Bolduc | F01C 1/22 60/605.1 |
| 2015/0275749 | A1 | 10/2015 | Thomassin et al. | |
| 2015/0275756 | A1 | 10/2015 | Bolduc et al. | |
| 2016/0160749 | A1 * | 6/2016 | Schnorbus | F02B 39/10 123/559.3 |
| 2016/0290240 | A1 | 10/2016 | Libera et al. | |
| 2017/0267370 | A1 | 9/2017 | Ullyott | |
| 2018/0030900 | A1 | 2/2018 | Mathis et al. | |
| 2018/0058311 | A1 * | 3/2018 | Choi | F02B 37/00 |
| 2018/0100438 | A1 | 4/2018 | Kemp et al. | |
| 2018/0215246 | A1 * | 8/2018 | Franke | F02B 63/04 |

FOREIGN PATENT DOCUMENTS

| | | | |
|---|---|---|---|
| JP | 2534338 B2 * | 9/1996 | F02B 37/105 |
| WO | WO2004/074655 A1 | 9/2004 | |
| WO | WO2017127068 A1 | 7/2017 | |

* cited by examiner

ENGINE COUPLING ARRANGEMENT

TECHNICAL FIELD

The application relates generally to internal combustion engines and, more particularly, to systems used for coupling such engines to accessories and to a rotatable load.

BACKGROUND OF THE ART

Aircraft accessories (generator(s), fuel pump(s), oil pump(s), etc.) can be driven by an auxiliary power unit (APU) so as to allow driving of the accessories independently of the rotatable load (helicopter rotor, propeller, etc.) driven by the main aircraft engine(s). A starter/generator is also typically required to start the main engine(s) because of the high inertia of the rotatable load. In some configurations, the accessories are in selective driving engagement with an engine and with the engine starter/generator, so that the accessories can be driven at and/or before engine start-up.

SUMMARY

In one aspect, there is provided an engine assembly comprising: an intermittent internal combustion engine having an engine shaft; a turbine having a turbine shaft and having an inlet in fluid communication with an exhaust of the intermittent internal combustion engine; a rotatable accessory; an output shaft for driving engagement with a load to be driven by the engine assembly; a gearbox having a first portion and a second portion, the engine shaft in driving engagement with the rotatable accessory via the first portion, the turbine shaft in driving engagement with the output shaft via the second portion, the gearbox configurable between an engaged configuration and a disengaged configuration, wherein: in the disengaged configuration, the first and second portions are decoupled, and the engine shaft and the turbine shaft are rotatable independently from each other; and in the engaged configuration, the first and second portions are coupled, and the engine shaft and the turbine shaft are drivingly engaged with each other via the coupled first and second portions.

In another aspect, there is provided an engine assembly comprising: an intermittent internal combustion engine having an engine shaft; a turbine having a turbine shaft and having an inlet in fluid communication with an exhaust of the intermittent internal combustion engine; a rotatable accessory; an output shaft for driving engagement with a load to be driven by the engine assembly; and a gearbox defining a first load path and a second load path, the engine shaft in driving engagement with the rotatable accessory via the first load path, the turbine shaft in driving engagement with the output shaft via the second load path, the gearbox including a clutch configurable between an engaged configuration where the clutch drivingly engages the first and second load paths with each other and a disengaged configuration where the clutch disengages the first and second load paths from each other, wherein: the engine shaft and the turbine shaft are rotatable independently from each other so that the engine shaft is rotatable independently from the output shaft when the clutch is in the disengaged configuration; and the engine shaft and the turbine shaft are both in driving engagement with the output shaft via the gearbox when the clutch is in the engaged configuration.

In a further aspect, there is provided a method of operating a engine assembly having an output shaft for driving a rotatable load, the method comprising: generating a first rotational input with an intermittent internal combustion engine and transmitting the first rotational input to a rotatable accessory via a gearbox selectively configurable between engaged and disengaged configurations; generating a second rotational input with a turbine and transmitting the second rotational input to the output shaft via the gearbox; and configuring the gearbox between the engaged and disengaged configurations, the intermittent internal combustion engine being in driving engagement with the output shaft via the gearbox in the engaged configuration and being rotatable independently from the output shaft when the gearbox is in the disengaged configuration; wherein with the gearbox in the disengaged configuration, the first and second rotational inputs are transmitted independently from each other, and with the gearbox in the engaged configuration, the first and second rotational inputs are combined in a combined rotational input transmitted to the output shaft via the gearbox.

DESCRIPTION OF THE DRAWINGS

Reference is now made to the accompanying figures in which.

DETAILED DESCRIPTION

Figure 1:
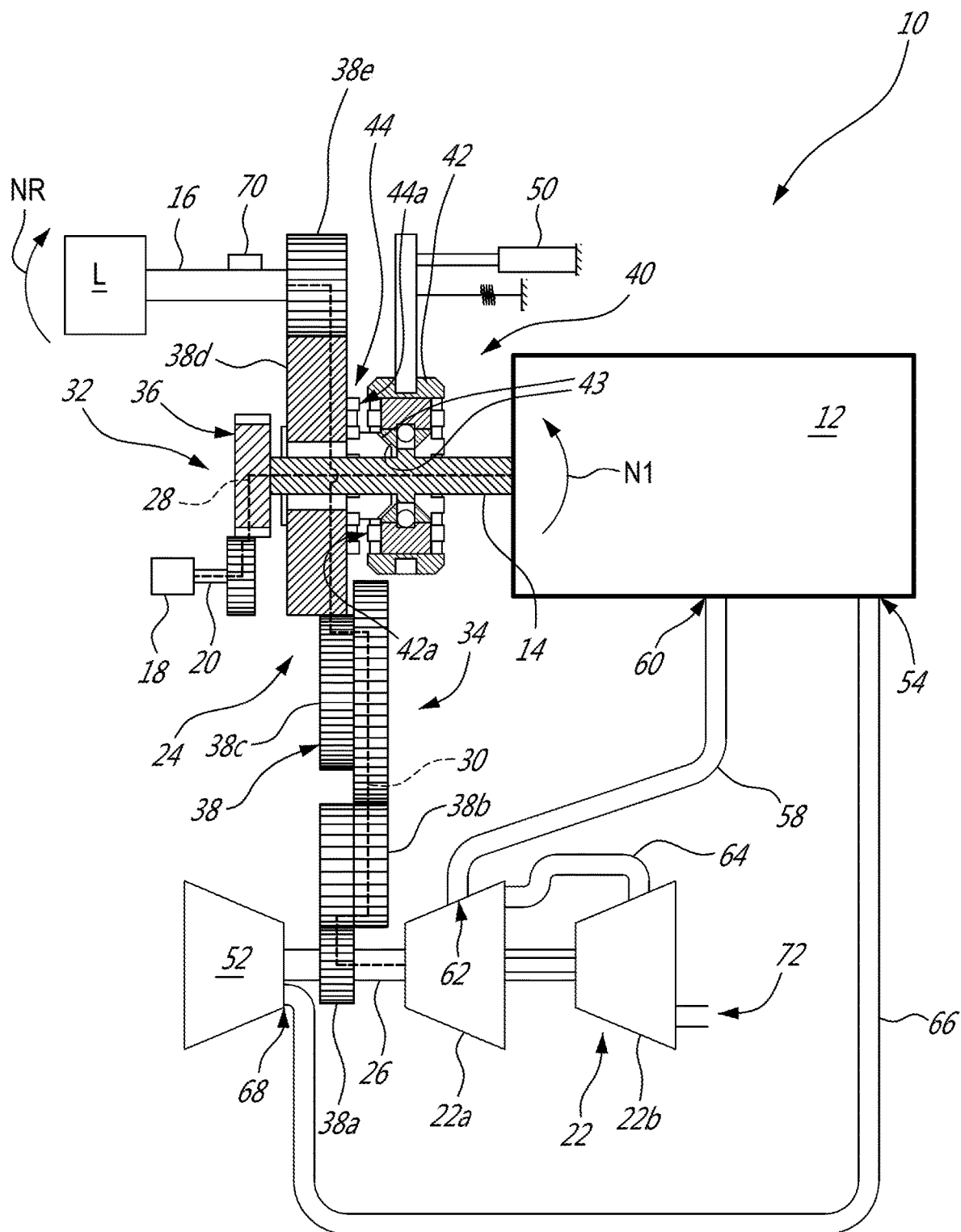
FIG. 1 is a schematic side view partially in cross-section of an engine assembly in a disengaged configuration.

Referring to FIG. 1, a compoundable engine, or engine assembly, 10 is generally shown and includes an internal combustion engine 12 which in the embodiment shown is an intermittent internal combustion engine. In a particular embodiment, the internal combustion engine 12 is a rotary engine comprising three rotary units each configured as a Wankel engine, with a rotor cavity having a profile defining two lobes, preferably an epitrochoid, in which a rotor is received with the geometrical axis of the rotor being offset from and parallel to the axis of the rotor cavity, and with the rotor having three circumferentially-spaced apex portions and a generally triangular profile with outwardly arched sides, so as to define three rotating combustion chambers with variable volume. It is understood that the internal combustion engine 12 may have any other suitable configuration, including, but not limited to, an engine including one or more rotary units each configured as a Wankel engine or as any other suitable type of rotary engine, or an engine including any number of reciprocating pistons. The pistons or rotors of the internal combustion engine 12 drive an engine shaft 14 that drives a rotatable load L.

In a particular embodiment, the engine assembly 10 is a compound cycle engine system or compound cycle engine such as described in Lents et al.'s U.S. Pat. No. 7,753,036 issued Jul. 13, 2010 or as described in Julien et al.'s U.S. Pat. No. 7,775,044 issued Aug. 17, 2010, or as described in Thomassin et al.'s U.S. patent publication No. 2015/0275749 published Oct. 1, 2015, or as described in Bolduc et al.'s U.S. patent publication No. 2015/0275756 published Oct. 1, 2015, the entire contents of all of which are incorporated by reference herein. The engine assembly 10 may be used as a prime mover engine, such as on an aircraft or other vehicle, or in any other suitable application.

In the embodiment shown, the engine assembly 10 is configured to drive the rotatable load L, such as a helicopter rotor, via an output shaft 16. It is understood that the engine assembly 10 may alternately be configured to drive any other appropriate type of load, including, but not limited to, one or more generator(s), propeller(s), rotor mast(s), fan(s), compressor(s), or any other appropriate type of load or combination thereof. The engine assembly 10 is also configured to drive one or more rotatable accessory(ies) 18 via a gear 36. The rotatable accessory(ies) 18 may include, for example, a fuel pump, an oil pump (e.g. engine oil, hydraulic oil), a coolant pump, a generator (e.g. starter/generator), an alternator, or any other suitable type of accessory.

In some situations, it is required to drive the accessory(ies) 18 without driving the rotatable load L. This may be the case for example when the vehicle stays on the ground and operation of the accessory(ies) 18 is required for passenger comfort, flight preparation, de-icing, etc. In such situations, the engine assembly 10 is operated in a hotel mode. Therefore, the engine assembly 10 is configurable in the hotel mode or configuration where the accessory(ies) 18 is/are driven without driving the load L, and in a normal mode or configuration where the accessory(ies) 18 and the rotatable load 14 are driven simultaneously.

Still referring to FIG. 1, the engine assembly 10 further includes a turbine section 22 fluidly connected to the engine 10 and configured to be driven by exhaust gases generated by the internal combustion engine 12. In the embodiment shown, the turbine section 22 comprises two turbines 22a and 22b mounted on the same shaft 26. A first conduit 58 fluidly connects an exhaust 60 of the internal combustion engine 12 to an inlet 62 of the first turbine 22a of the turbine section 22, and a conduit 64 fluidly connects an exhaust of the first turbine 22a to an inlet of the second turbine 22b. The two turbines 22a and 22b may have different reaction ratios from one another; in a particular embodiment, the first turbine 22a has a smaller reaction ratio than the second turbine 22b, and the first turbine 22a is configured as an "impulse" turbine, i.e. configured to be driven by exhaust pulses provided by the engine exhaust. Other configurations are possible. It is understood that the engine assembly 10 may alternately comprise more than two turbines or a single turbine.

In the embodiment shown, the engine assembly 10 further includes a compressor 52 for compressing the air before it is fed to an air inlet 54 of the internal combustion engine 12. A conduit 66 fluidly connects an outlet 68 of the compressor 52 to an air inlet 54 of the internal combustion engine 12.

In the embodiment shown, the rotors of the turbine section 22 and of the compressor 52 are mounted on the same turbine shaft 26. The turbine section 22 and compressor 52 may alternately be mounted on separate shafts. In the embodiment shown, the engine shaft 14 and the turbine shaft 26 are parallel and radially offset from each other. Other configurations are contemplated.

Figure 2:
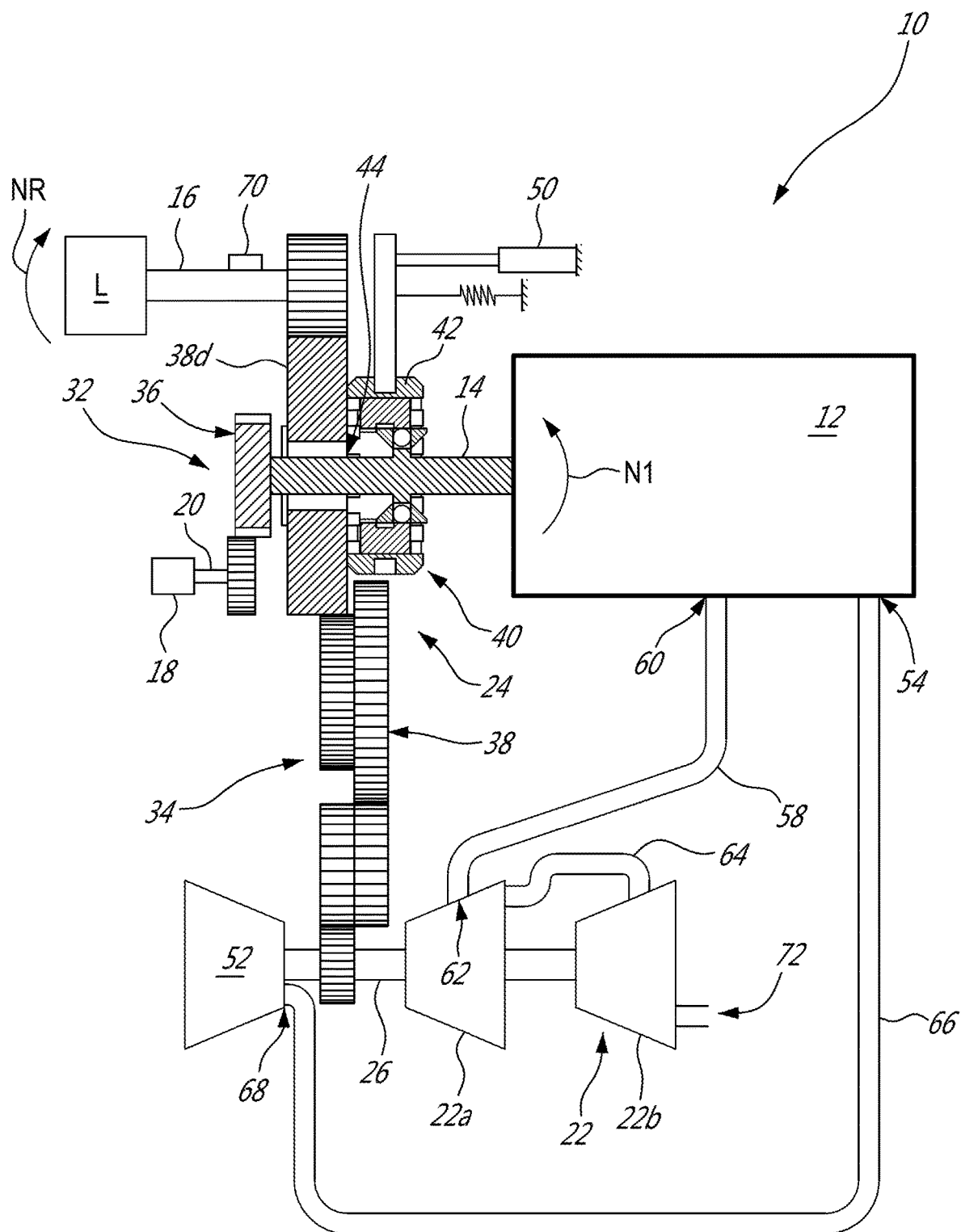
FIG. 2 is a schematic side view partially in cross-section of the engine assembly of FIG. 1 in an engaged configuration.

Referring now to FIGS. 1 and 2, the engine assembly 10 further includes a gearbox 24 that is configurable between a disengaged configuration as illustrated in FIG. 1 and an engaged configuration as illustrated in FIG. 2. The gearbox 24 is in driving engagement with both the turbine shaft 26 and the engine shaft 14. The turbine section 22 is configured to compound power with the internal combustion engine 12 via the gearbox 24 in the engaged configuration. Power from the internal combustion engine 12 and from the turbine section 22 may thus be compounded to drive the rotatable load L, the compressor 52 and the rotatable accessory 18 via the gearbox 24.

In the embodiment shown and as illustrated in FIG. 1, the gearbox 24 defines a first load path 28 and a second load path 30 each connected with a respective one of the output shaft 16 and accessory 18. The engine shaft 14 is in driving engagement with the accessory 18 via the first load path 28. The turbine shaft 26 is in driving engagement with the output shaft 16 via the second load path 30. The gearbox 24 has a first portion 32 defining the first load path 28 and a second portion 34 defining the second load path 30. The first portion 32 drivingly engages the engine shaft 14 with the rotatable accessory 18 whereas the second portion 34 drivingly engages the turbine shaft 26 with the output shaft 16. The portions 32, 34 each include one or more gear(s) that are configured to define a predetermined ratio between the rotational speeds of the output shaft 16 and of the turbine shaft 26, and a predetermined ratio between the rotational speeds of the accessory 18 and of the engine shaft 14.

In the embodiment shown, the first portion 32 includes an accessory pinion gear 36 configured to engage a gear connected to a shaft 20 of the accessory 18; in an alternate embodiment, the first portion 32 may be defined by a gear set including a plurality of meshed gears.

In the embodiment shown, the second portion 34 includes a set 38 of meshed gears 38a, 38b, 38c, 38d, 38e. A first gear 38a is mounted on the turbine shaft 26 to rotate integrally therewith. The first gear 38a is meshed with a first idler gear 38b, which is defined has a double gear with two gear portions having the diameter; the first gear 38a is meshed with one of the two gear portions. A second idler gear 38c is also defined as a double gear, with two gear portions having different diameters. The portion of the second idler gear 38c having the greatest diameter is meshed with the other portion of the first idler gear 38b. The portion of the second idler gear 38c having the smallest diameter is meshed with a main gear 38d. The main gear 38d is also meshed with a third idler gear 38e mounted to the output shaft 16 to rotate integrally therewith. In the embodiment shown, the gear set 38 defines a rotational speed ratio such that the rotational speed of the output shaft 16 and of the rotatable load L is less than that of the turbine shaft 26.

Referring back to FIGS. 1 and 2, the gearbox 24 further includes a clutch 40 for switching between the engaged and the disengaged configurations. In the embodiment shown, the clutch 40 has one component 42 which is part of the first portion 32 and another component 44 which is part of the second portion 34, and is operable to engage or disengage the first and second portions 32 and 34 of the gearbox 24 with each other. In a particular embodiment, the clutch 40 is sized to carry about two thirds of a full power of the internal combustion engine 12; other configurations are possible.

Referring more particularly to FIG. 1, in the disengaged configuration, the first and second portions 32 and 34, and therefore the first and second load paths 28 and 30 of the gearbox 24, are decoupled from each other such that the engine shaft 14 and the turbine shaft 26 rotate independently from each other. Referring more particularly to FIG. 2, in the engaged configuration, the first and second portions 32 and 34, and therefore the first and second load paths 28 and 30, are coupled such that the engine shaft 14 and the turbine shaft 26 are both in driving engagement with the output shaft 16 through the gearbox 24. In other words, in the engaged configuration, the engine shaft 14 and the turbine shaft 26 are drivingly engaged with each other via the gearbox 24, and power from the turbine section 22 and the internal combustion engine 12 is compounded for driving the rotatable load L via the gearbox 24.

In both the engaged and disengaged configurations the rotatable accessory 18 remains in driving engagement with the internal combustion engine 12 via the first portion 32 of the gearbox 24. It is understood that, in the engaged configuration, a portion of a power generated by the turbine section 22 contributes in driving the rotatable accessory 18 via the gearbox 24. In other words, power from the internal combustion engine 12 and the turbine section 22 is compounded to drive the rotatable accessory 18 through the gearbox 24.

In the embodiment shown, the clutch 40 is a synchromesh clutch. It is however understood that any other suitable clutch may be used, such as, but not limited to, a magnetic clutch, a friction clutch, or a dog clutch. In the depicted embodiment, the components of the clutch 40 are a slotted wheel 42 and a toothed wheel 44, which include complementary male and female synchronization friction cones 43 to facilitate engagement when a speed difference is present between the two components; in an alternate embodiment, the synchronization friction cones 43 are omitted, and the clutch 40 is configured as a dog clutch. The toothed wheel 44 is configured to engage the slotted wheel 42 so as to rotate together therewith. The slotted and toothed wheels 42 and 44 are axially movable relative to each other between a first position (FIG. 1) corresponding to the disengaged configuration in which the slotted and toothed wheels 42 and 44 are away from each other and independently rotatable from one another and a second position (FIG. 2) corresponding to the engaged configuration in which the slotted and toothed wheels are coupled with each other for synchronous rotation. The slotted wheel 42 is in driving engagement with the toothed wheels 44 when male members, or teeth, 44a of the toothed wheel 44 engage female members, or slots, 42a of the slotted wheel 42. Other configurations are contemplated. It is understood that the two components of the clutch 40 may be any other suitable components able to transfer a torque once they are engaged with each other.

In the illustrated embodiment, the main gear 38d of the second load path 30 is disposed around the engine shaft 14. More specifically, the main gear 38d has a hollow center allowing the engine shaft 14 to extend through the main gear 38d without being connected thereto, and the accessory pinion gear 36 is located on the other side of the main gear 38d, i.e. the main gear 38d is located between the accessory pinion gear 36 and the internal combustion engine 12. The main gear 38d is used to couple the second portion 34 of the gearbox 24 defining the second load path 30 to the engine shaft 14. The main gear 38d is configured to rotate independently with respect to the engine shaft 14 when the gearbox 24 is in the disengaged configuration, and the clutch 40, which is located between the main gear 38d and the internal combustion engine 12, creates a driving engagement between the main gear 38d of the second load path 30 and the engine shaft 14 when the gearbox 24 is in the engaged configuration. Therefore, one of the slotted and toothed wheels 42 and 44 rotates synchronously with the main gear 38d while the other of the slotted and toothed wheels 42 and 44 rotates synchronously with the engine shaft 14.

In the illustrated embodiment, the toothed wheel 44 is affixed to, or may be an integral part of, the main gear 38d, and the slotted wheel 42 and the engine shaft 14 are in driving engagement with each other such that they rotate integrally, for example by having the slotted wheel 42 directly connected to and extending around the engine shaft 14. It is understood that the slotted and toothed wheels 42, 44 may be inverted such that the toothed wheel 44 is affixed to the engine shaft 14 and the slotted wheel 42 is affixed to the main gear 38d.

Other configurations are of course possible. As a non-limiting example, both the accessory pinion gear 36 and the elements of the clutch 40 may be located between the main gear 38d and the internal combustion engine 12. In this embodiment, the main gear 38d does not need to be hollow, and the engine shaft 14 does not need to pass therethrough. In another alternate embodiment, the accessory pinion gear 36 may be located between the main gear 38d and the internal combustion engine 12, while the elements of the clutch 40 may be located on the opposite side of the main gear 38d, i.e. so that the main gear 38d is located between the elements of the clutch 40 and the internal combustion engine 12. The main gear 38d is hollow, and the engine shaft 14 extends therethrough so as to receive the clutch 40. In both of these embodiments, one of the slotted wheel 42 and the toothed wheel 44 may be affixed to, or may be an integral part of, the main gear 38d, and the other of the slotted wheel 42 and the toothed wheel 44 may be affixed to, or may be an integral part of, the engine shaft 14, so that the clutch 40 allows for selective engagement and disengagement of the main gear 38d and engine shaft 14.

As illustrated in FIG. 1, in the disengaged configuration, the slotted wheel 42 is spaced apart from the toothed wheel 44. The output shaft 16 and the rotatable load L are solely driven by the turbine shaft 26 via the second load path 30 defined by the second portion 34 of the gearbox 24. The accessory 18 is solely driven by the engine shaft 14 via the first load path 28 defined by the first portion 32 of the gearbox 24.

As illustrated in FIG. 2, in the engaged configuration, the slotted wheel 42 is moved axially to be in a mating engagement with the toothed wheel 44 such that teeth engage the slots. There is a driving engagement between the engine shaft 14 and the main gear 38d of the second portion 34 of the gearbox 24 via the engagement between the slotted and toothed wheels 42 and 44 of the clutch 40, so that the two load paths 28, 30 (FIG. 1) are engaged with each other. Power from the internal combustion engine 12 and from the turbine section 22 is compounded to drive the output shaft 16 and the rotatable load L engaged to the output shaft 16.

In the illustrated embodiment, an actuator 50 is used to selectively position the gearbox in one or the other of the engaged and the disengaged configurations. In the embodiment shown, the actuator 50 moves the slotted wheel 42 between the two positions. The actuator 50 may be for example an electrical, hydraulic, or pneumatic actuator. Any suitable actuator may be used. In the embodiment shown, the actuator 50 is biased such that its default and de-energized position corresponds to the engaged configuration of the gearbox 24. In other words, energy must be provided to the actuator 50 to move the slotted wheel 42 from a position where it is engaged with the toothed wheel 44 to a position where it is disengaged from the toothed wheel 44. In the embodiment shown, a force is exerted on the slotted wheel 42 by the actuator 50 to separate it from the toothed wheel 44. In a particular embodiment, such a configuration ensures that the engagement between the wheels 42 and 44 is maintained upon failure of the actuator 50 so as to maintain the compounding of power from the engine 12 and the turbine section 22 to drive the load L.

In the embodiment shown, when the gearbox 24 is in the disengaged configuration, the compressor 52 is driven solely by the turbine section 22 via the turbine shaft 26. In the engaged configuration, the compressor 52 is driven by both the turbine section 22 and the internal combustion engine 12 via the first and second gearbox portions 32 and 34 and corresponding load paths 28 and 30 of the gearbox 24.

In some cases, it may be required to limit rotation of the rotatable load L. For example, when the helicopter is on the ground, it may be desirable to prevent rotation of the helicopter rotor. In the embodiment shown, a brake 70 is used to limit or prevent rotation of the rotatable load L when the gearbox 24 is in the disengaged configuration. In the illustrated embodiment, the brake 70 is configured to engage the output shaft 16, but other configurations are contemplated. The brake 70 may engage any component forming part of the second load path 30.

Referring to FIGS. 1-2, to operate the engine assembly 10, a first rotational input is generated with the internal combustion engine 12 and a second rotational input is generated with the turbine section 22. The gearbox 24 is configured between the engaged and the disengaged configurations. In the disengaged configuration, the first rotational input is transmitted to the rotatable accessory 18 independently from the second rotational input and the second rotational input is transmitted to the output shaft 16 independently from the first rotational input. In the engaged configuration, the first and second rotation inputs are combined in a combined rotational input. The combined rotational input is then transmitted to the output shaft 16 and to the rotatable accessory 18.

In the illustrated embodiment, the second rotational input or a portion of the combined rotational input is transmitted to the compressor 52. In the embodiment shown, coupling the first and second rotational inputs comprises actuating the clutch 40 between the first position and the second position. The first and second rotational inputs are isolated from each other in the first position and combined with each other in the second position. In the embodiment shown, to configure the gearbox 24 between the engaged and disengaged configurations, a force is exerted on one component 42 of the gearbox 24 to configure the gearbox 24 in the disengaged configuration.

In a particular embodiment, the selectively configurable gearbox 24 allows for the same engine assembly 10 to perform the roles of the main engine and of the APU, driving the rotatable load of the aircraft and also driving the accessories even when the rotatable load is not rotated.

Figure 3:
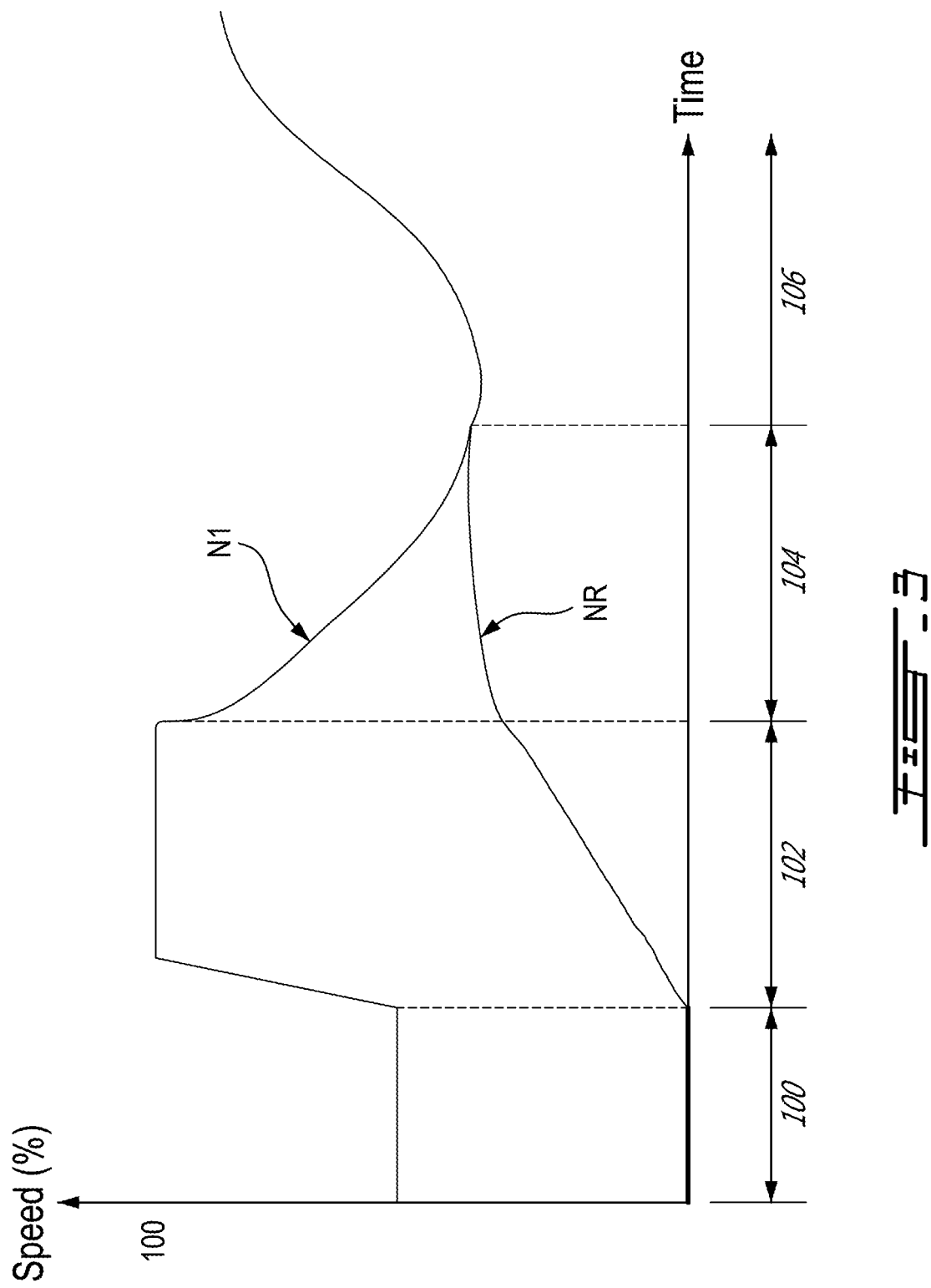
FIG. 3 is a graph illustrating a variation of rotational speeds of an internal combustion engine shaft and of an output shaft of the engine assembly of FIG. 1.

Referring now to FIGS. 1-3, as previously mentioned, the gearbox 24 allows the internal combustion engine 12 to drive the accessory 18 without driving the output shaft 16 and the rotatable load L attached thereto. To start rotation of the rotatable load L, the two components 42 and 44 of the clutch 40 are brought in driving engagement with each other thereby coupling the first and second load paths 28 and 30. However, there can be a rotational speed mismatch between the two components 42, 44 of the clutch 40 when the components 42 and 44 are the engine shaft 14 is already rotating independently of the turbine shaft 26. Hence, directly engaging the components 42 and 44 with each other when the engine shaft 14 is already rotating might wear and/or damage the clutch 40, and/or produce undesirable shock load, vibrations and/or sound. In some embodiments, synchronization prior to engagement may be particularly important when the clutch 40 does not have synchronization features, for example when the clutch 40 is configured as a dog clutch. Clutches without synchronization features may provide for a more robust engagement and accordingly may be desirable despite the necessity of performing a speed matching before engagement.

In a particular embodiment and referring more particularly to FIG. 3, the engine assembly 10 is operated in the hotel mode 100, during which the internal combustion engine 12 is used to drive the accessory(ies) 18 through the first load path 28 of the gearbox 24, with the gearbox 24 in the disengaged configuration. During the hotel mode period 100, the internal combustion engine 12 may be operated for example at idle, and the brake 70 may be engaged to prevent rotation of the load L so that the rotational speed NR of the output shaft 16 and of the rotatable load L is 0. Since the internal combustion engine 12 is not connected to the rotatable load L, the inertia preventing its rotation is relatively small, thus facilitating starting of the internal combustion engine 12.

When rotation of the load L is required, the brake 70, if used, is released, allowing the exhaust gases from the internal combustion engine 12 to drive rotation of the turbine section 22. The engine assembly 10 begins a load air start period 102 during which the power level of the internal combustion engine 12 is increased such that the rotational speed N1 of the engine shaft 14 increases. By so doing, the quantity of exhaust gases generated by the internal combustion engine 12 and a pressure force provided by the exhaust gases increases. Therefore, the rotational speed of the turbine shaft 26, and accordingly the rotational speed NR of the output shaft 16 and of the rotatable load L engaged thereto increase as the turbine section 22 is driven by the exhaust gases of the internal combustion engine 12. During the load air start period 102, the gearbox 24 is still in the disengaged configuration, and accordingly the turbine shaft 26 and the engine shaft 14 are independently rotatable from each other, i.e. the turbines of the turbine section 22 are "free turbines". Stated otherwise, during the load air start period 102, the internal combustion engine 12 induces rotation of the output shaft 16 without driving engagement between the two shafts 14 and 16. The rotational speed of the rotatable load L is increased to a predetermined rotational speed by the shaft power from the turbine section 22 and without the shaft power of the internal combustion engine 12 because the engine shaft 14 is drivingly decoupled from the turbine shaft 26.

In the illustrated embodiment, during the load air start period 102, the power level of the internal combustion engine 12 is increased from an idle power level, where the rotational speed of the engine shaft is about 2000 rotation per minute, to a power level for example corresponding to a maximum nominal rotational speed of the engine shaft 14. Then, the power level of the internal combustion engine 12 and rotational speed of the engine shaft 14 are maintained (e.g. remain constant) during a remainder of the load air start period 102 which spans a given period of time that is sufficient to bring the turbine shaft 26 and output shaft 16 to the predetermined rotational speed. Other configurations are also possible.

Once the rotational speed of the output shaft 16 reaches the predetermined rotational speed, the load air start period 102 ends and a speed matching period 104 begins, during which the gearbox 24 is still in the disengaged configuration. During the speed matching period 104, the power level of the internal combustion engine 12, and accordingly the rotational speed of the engine shaft 14, are adjusted until the engine shaft 14 and the turbine shaft 26 become drivingly engageable with each other. In the embodiment shown, the power level of the internal combustion engine 12 is reduced relatively quickly to minimize the impact of this reduction on the rotational speed of the turbine section 22, and accordingly the rotational speed of the engine shaft 14 decreases quickly. During that period, the output shaft 16 may still accelerate, but at a rate inferior to that of the load air start period 102, because of the inertia of the rotatable load L; alternately, the output shaft 16 may decelerate at a rate inferior to that of the engine shaft 14, again because of the inertia of the rotatable load L. Other variations are also possible; for example, the output shaft 16 may first accelerate, then decelerate. The speed matching period ends when the engine shaft 14 and the turbine shaft 26 become drivingly engageable with each other. In the embodiment shown, the speed matching period 104 ends when the rotational speed of the two components 42 and 44 of the clutch 40 match sufficiently to be engaged with each other.

The turbine shaft 26 is then drivingly engaged with the engine shaft 14 by changing the configuration of the gearbox 24 to the engaged configuration, which marks the end of the speed matching period 104 and the beginning of a normal (compounded) period 106. During the normal period 106, both the turbine section 22 and the internal combustion engine 12, and their respective shafts 14 and 26, are in driving engagement with the rotatable load L such that their power is compounded to drive the rotatable load L.

In the embodiment shown, drivingly engaging the turbine section 22 with the internal combustion engine 12 comprises drivingly engaging the two components 42 and 44 of the clutch 40. In the illustrated embodiment, engaging the turbine section 22 with the internal combustion engine 12 comprises actuating the clutch 40 of the gearbox 24. In the embodiment shown, actuating the clutch 40 comprises de-energizing the actuator 50.

In a particular embodiment, matching the rotational speeds of the two components 42 and 44 prior to changing the configuration of the gearbox 24 ensures good durability of the clutch 40. In a particular embodiment, the matching of the rotational speeds allows the use of an interference clutch, such as a dog clutch, which provides a no-slip shaft solid coupling during the normal period 106. In a particular embodiment, the use of an interference clutch allows for losses in the engine assembly 10 to be reduced, and/or for the efficiency of the engine assembly 10 to be increased as compared to the losses and efficiency obtained with a friction clutch, for example because an interference clutch might be less prone to friction loss than a friction clutch. However, in a particular embodiment, matching the rotational speeds of the two components 42 and 44 prior to changing the configuration of the gearbox 24 may also be beneficial when a friction clutch is used; the durability of a friction clutch might be increased by decreasing a rotational speed difference between its components before they are engaged with each other.

It is however understood that the speed matching period 104 may be omitted when the engaged configuration of the gearbox 24 is defined by a type of clutch that can be engaged without speed matching. In this case, the engine assembly transitions from the load air start period 102 to the normal period 106 upon engagement of the two load paths 28, 30 of the gearbox 24.

In the illustrated embodiment, the rotatable accessory 18 is continuously driven by the internal combustion engine 12 during the hotel mode period 100, the load air start period 102, and the speed matching period 104. During the normal period 106, the rotatable accessory 18 is driven by both the turbine section 22 and the internal combustion engine 12.

In the embodiment shown, operation of the engine assembly 10 comprises the driving of the compressor 52 that is fluidly connected to the internal combustion engine 12. The compressor 52 is driven by at least the turbine section 22 to supply compressed air to the internal combustion engine 12. The compressor 52 is driven by both the internal combustion engine 12 and by the turbine section 22 during the normal period 106.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. An engine assembly comprising:
 an intermittent internal combustion engine having an engine shaft;
 a turbine having a turbine shaft and having an inlet in fluid communication with an exhaust of the intermittent internal combustion engine;
 a rotatable accessory;
 an output shaft for driving engagement with a load to be driven by the engine assembly;
 a gearbox having a first portion and a second portion, the engine shaft in driving engagement with the rotatable accessory via the first portion, the turbine shaft in driving engagement with the output shaft via the second portion, the gearbox configurable between an engaged configuration and a disengaged configuration, wherein:
  in the disengaged configuration, the first and second portions are decoupled, and the engine shaft and the turbine shaft are rotatable independently from each other, the rotatable accessory remaining in driving engagement with the intermittent internal combustion engine via the first portion of the gearbox; and
  in the engaged configuration, the first and second portions are coupled, and the engine shaft and the turbine shaft are drivingly engaged with each other via the coupled first and second portions.

2. The engine assembly of claim 1, further comprising a compressor in driving engagement with the turbine shaft, the compressor fluidly connected to an inlet of the intermittent internal combustion engine.

3. The engine assembly of claim 1, wherein the intermittent internal combustion engine is a rotary engine.

4. The engine assembly of claim 1, wherein the accessory is selected from the group consisting of: oil pump, fuel pump, coolant pump, generator, and alternator.

5. The engine assembly of claim 1, wherein the gearbox is configurable between the engaged and disengaged configurations via a clutch including a first component forming part of the first portion and a second component forming part of the second portion, the first and second components engaged with each other in the engaged configuration and disengaged from each other in the disengaged configuration.

6. The engine assembly of claim 1, further comprising an actuator operable to selectively position the gearbox in each of the engaged and disengaged configurations.

7. The engine assembly of claim 6, wherein a de-energized position of the actuator corresponds to the engaged configuration.

8. The engine assembly of claim 1, further comprising a brake selectively engageable to a component of the second portion for limiting rotation of the output shaft in the disengaged configuration.

9. An engine assembly comprising:
an intermittent internal combustion engine having an engine shaft;
a turbine having a turbine shaft and having an inlet in fluid communication with an exhaust of the intermittent internal combustion engine;
a rotatable accessory;
an output shaft for driving engagement with a load to be driven by the engine assembly; and
a gearbox defining a first load path and a second load path, the engine shaft in driving engagement with the rotatable accessory via the first load path, the turbine shaft in driving engagement with the output shaft via the second load path, the gearbox including a clutch configurable between an engaged configuration where the clutch drivingly engages the first and second load paths with each other and a disengaged configuration where the clutch disengages the first and second load paths from each other, wherein:
the engine shaft and the turbine shaft are rotatable independently from each other so that the engine shaft is rotatable independently from the output shaft to drive the rotatable accessory when the clutch is in the disengaged configuration; and
the engine shaft and the turbine shaft are both in driving engagement with the output shaft via the gearbox when the clutch is in the engaged configuration.

10. The engine assembly of claim 9, further comprising a compressor in driving engagement with the turbine shaft, the compressor fluidly connected to an inlet of the intermittent internal combustion engine.

11. The engine assembly of claim 9, wherein the intermittent internal combustion engine is a rotary engine.

12. The engine assembly of claim 9, wherein the accessory is selected from the group consisting of: oil pump, fuel pump, coolant pump, generator, and alternator.

13. The engine assembly of claim 9, wherein the clutch has two components, one of the two components in driving engagement with the first load path, the other of the two components in driving engagement with the second load path, one of the two components having male members and the other of the two components having female members engaged with the male members in the engaged configuration.

14. The engine assembly of claim 9, further comprising an actuator operatively connected to the clutch and operable to shift the clutch between the engaged and disengaged configurations.

15. The engine assembly of claim 14, wherein a de-energized position of the actuator corresponds to the engaged configuration.

16. The engine assembly of claim 9, further comprising a brake selectively engageable to a component of the second load path for limiting rotation of the output shaft in the disengaged configuration.

17. A method of operating an engine assembly having an output shaft for driving a rotatable load, the method comprising:
generating a first rotational input with an intermittent internal combustion engine and transmitting the first rotational input to a rotatable accessory via a gearbox selectively configurable between engaged and disengaged configurations;
generating a second rotational input with a turbine and transmitting the second rotational input to the output shaft via the gearbox; and
configuring the gearbox between the engaged and disengaged configurations, the intermittent internal combustion engine being in driving engagement with the output shaft via the gearbox in the engaged configuration and being rotatable independently from the output shaft to drive the rotatable accessory when the gearbox is in the disengaged configuration;
wherein with the gearbox in the disengaged configuration, the first and second rotational inputs are transmitted independently from each other, and with the gearbox in the engaged configuration, the first and second rotational inputs are combined in a combined rotational input transmitted to the output shaft via the gearbox.

18. The method of claim 17, further comprising transmitting the second rotational input to a compressor fluidly connected to an inlet of the intermittent internal combustion engine.

19. The method of claim 17, wherein combining the first and second rotational inputs comprises actuating a clutch to drivingly engage the first and second rotational inputs with each other.

20. The method of claim 17, wherein configuring the gearbox comprises exerting a force on one component of the gearbox to configure the gearbox in the disengaged configuration.

* * * * *